Jan. 13, 1959      H. E. CHAPLIN      2,868,477

JET-PROPELLED VERTICAL TAKE-OFF AIRCRAFT

Filed Sept. 22, 1953

Inventor
Herbert E. Chaplin

By Watson, Cole,
Grindle & Watson
Attorneys

United States Patent Office 2,868,477
Patented Jan. 13, 1959

2,868,477

JET-PROPELLED VERTICAL TAKE-OFF AIRCRAFT

Herbert Eugene Chaplin, Hayes, England, assignor to The Fairey Aviation Company Limited, Hayes, England, a British company Application September 22, 1953, Serial No. 381,664

3 Claims. (Cl. 244—12)

This invention relates to aircraft and is concerned with aircraft which are designed to climb rapidly, and which for this purpose are of the type having one or more propulsive units capable of giving a static thrust exceeding the weight of the aircraft.

According to one aspect of the invention an aircraft of this type is provided with means for supporting it in a substantially vertical position so that it can take off substantially vertically.

In one form of the invention the aircraft is provided with an undercarriage capable of supporting it in such a position. The undercarriage may be capable of adjustment from the vertical take-off position to a position in which it supports the aircraft in a conventional generally horizontal position. In this case preferably the undercarriage is power driven so that it can be adjusted from one position to another while supporting the aircraft. The undercarriage may comprise skids.

According to a further aspect of the invention an aircraft of the type specified has a pilot's seat adjustable through a substantial angle about a horizontal transverse axis relatively to the fuselage, to enable the pilot to sit in it whether the aircraft is in the horizontal position or the vertical position. The seat may be adjustable through substantially 90° to enable the pilot to sit at the same inclination whether the aircraft is in the horizontal position or the vertical position. Preferably at least a part of the cockpit is mounted to move with the pilot's seat so that in each position the pilot obtains a satisfactory field of view and has adequately access to the controls.

The invention may be carried into practice in various ways but one specific embodiment and a modification, will now be described by way of example with reference to the accompanying drawings in which.

Figure 1:
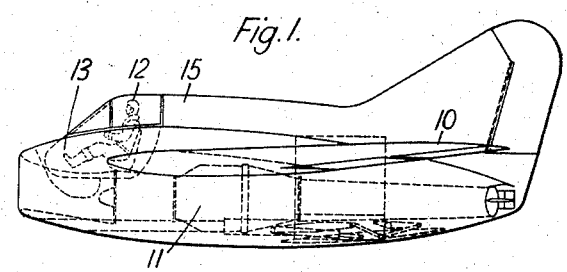
Figure 1 is a side elevation of an aircraft equipped with supporting means in accordance with the present invention.

In the embodiment shown the invention is applied to an interceptor fighter aircraft of small high-speed type with heavily swept back wings 10 and twin jet propulsion units 11 which are mounted side by side in the fuselage, and which together are capable of giving a thrust considerably exceeding the weight of the aircraft.

The pilot 12 is accommodated in a cockpit 13 mounted to pivot as a whole about a horizontal transverse axis in the neighbourhood of its forward end 14 where the pilot's feet are situated. The cockpit is power-operated and can turn through an angle of about 90° so that the pilot can sit in a normal attitude whether the aircraft is in a normal horizontal position for high speed forward flight as shown in Figure 1 or in a substantially vertical position for vertical take off or landing as is shown in Figure 3.

When the aircraft is in the vertical position, the cockpit 13 protrudes from the fuselage 15, but when it is in the horizontal position of Figure 1, it is withdrawn into the fuselage so as to interfere as little as possible with the air flow during normal flight.

Figure 2:
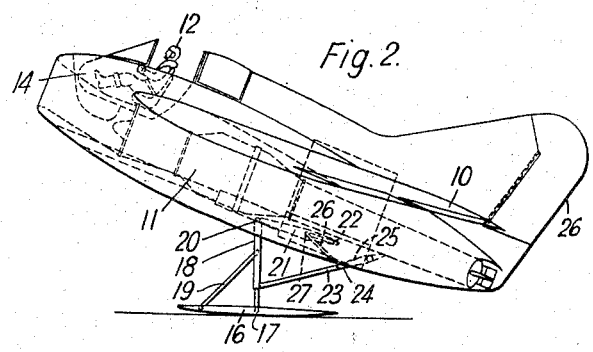
Figure 2 is a view similar to Figure 1 showing the supporting means in the extended position with the aircraft in a substantially horizontal position.
Figure 3:
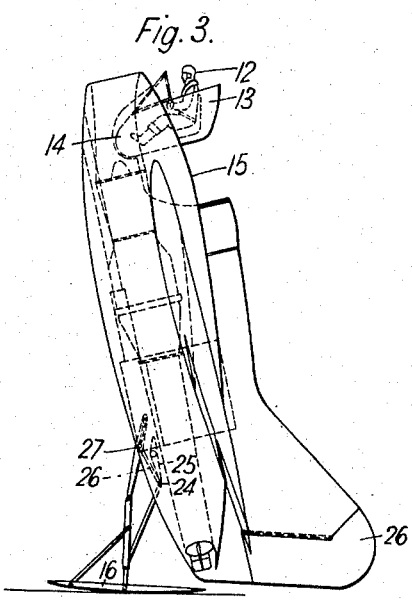
Figure 3 is a view similar to Figure 2 with the aircraft in a substantially vertical position.

Figure 1 shows a land-based aircraft equipped with a skid type of undercarriage which can support it in a generally horizontal position as shown in Figure 2 or in a vertical position for take off as shown in Figure 3. For this purpose each unit of the undercarriage comprises a long skid 16 pivoted at about its centre 17 to a main resilient strut 18 and braced to it by a bracing strut 19 so as to remain substantially perpendicular to it. The upper end of the main strut is pivoted at 20 to a main operating arm 21 which extends forwardly from a fixed pivot 22 when the aircraft is in the horizontal position. A point near the lower end of the main strut 18 is connected by a bracing link 23 to the free end 24 of an auxiliary operating arm 25 which is also connected by a further link 26 to an intermediate point 27 of the main operating arm.

The main operating arm 21 is power-operated so that it can be swung down about its rear pivot 22 through an angle slightly less than 180°. This swings the auxiliary arm 25 through much the same angle so that the bracing link remains at an angle to the main strut 18 so as to support it whilst at the same time causing it to turn from a position inclined at nearly 90° to the length of the fuselage to a position inclined at quite a small angle to it. At the same time the movement of the main arm 21 shifts the strut 18 so that insead of being roughly under the middle of the fuselage when in a generally horizontal position as shown in Figure 2, its end is approximately level with the rear end of the fuselage, as shown in Figure 3, so that it can support the aircraft in a substantially vertical position with the tail 36 just clear of the ground. The undercarriage can also be retracted to a position shown in Figure 1.

Accordingly in operation the pilot can operate his controls so as to tilt the aircraft to a substantially vertical position whilst turning the cockpit so that he remains seated in a conventional attitude. He can then take off substantially vertically and after climbing to an appropriate height he can flatten out partially or completely. Landing can, if necessary, be effected in the conventional attitude on the skid undercarriage when extended to the appropriate position.

What I claim as my invention and desire to secure by Letters Patent is:

1. An aircraft including a fuselage, wings fixed in relation to the fuselage, jet propulsion means fixed in relation to the fuselage and capable of giving a total static thrust exceeding the weight of the aircraft, an undercarriage connected to the fuselage and movable to a position in which it supports the aircraft with the fuselage in a substantially vertical position for substantially vertical take-off, a cockpit for the pilot mounted in the fuselage for movement between a first position in which the pilot is upright when the fuselage is substantially horizontal and a second position in which the pilot is upright when the fuselage is in vertical take-off position, and power-driven means controllable by the pilot for moving the cockpit relatively to the fuselage between its two positions and controlling its movement, the cockpit being pivotally connected to the fuselage for rotation about an axis near the pilot's feet and so shaped and located as to be substantially retracted within the outline of the fuselage in the first position but to protrude from the fuselage in the second position.

2. An aircraft including a fuselage, wings fixed in relation to the fuselage, jet propulsion means fixed in relation to the fuselage and capable of giving a total static thrust exceeding the weight of the aircraft, an undercarriage connected to the fuselage and movable relatively thereto between a position in which it supports the fuselage in a substantially horizontal position, and a substantially vertical position for substantially vertical take-off, power-driven means for moving the undercarriage from one position to the other while supporting the aircraft, a cockpit for the pilot mounted in the fuselage to be capable of movement between a first position in which the pilot is upright when the fuselage is substantially horizontal and a second position in which the pilot is upright when the fuselage is in the vertical take-off position, and power-driven means controllable by the pilot for moving the cockpit relatively to the fuselage between its two positions and controlling its movement, the cockpit being pivotally connected to the fuselage for rotation about an axis near the pilot's feet and so shaped and located as to be substantially retracted within the outline of the fuselage in the first position but to protrude from the fuselage in the second position.

3. An aircraft including a fuselage, wings fixed in relation to the fuselage, jet propulsion means fixed in relation to the fuselage and capable of giving a total static thrust exceeding the weight of the aircraft, an undercarriage connected to the fuselage and movable relatively thereto between a position in which it supports the fuselage in a substantially horizontal position, and a substantially vertical position for substantially vertical take-off, power-driven means for moving the undercarriage from one position to the other while supporting the aircraft, a cockpit for the pilot mounted in the fuselage to be capable of movement between a first position in which the pilot is upright when the fuselage is substantially horizontal and a second position in which the pilot is upright when the fuselage is in the vertical take-off position, and power-driven means controllable by the pilot for moving the cockpit relatively to the fuselage between its two positions and controlling its movement, said fuselage being formed with a recess opening upwardly therefrom in the horizontal position of the fuselage, said cockpit being pivotally connected to the fuselage for swinging movement into and from said recess, and being retracted into said recess in said first position and projected from said recess in said second position.

References Cited in the file of this patent

UNITED STATES PATENTS

| | | |
|---|---|---|
| 1,128,072 | Steinmetz | Feb. 9, 1915 |
| 1,358,603 | Zahm | Nov. 9, 1920 |
| 1,786,545 | Noeggerath | Dec. 30, 1930 |
| 1,828,251 | Kiwull | Oct. 20, 1931 |
| 2,415,071 | Brie | Feb. 4, 1947 |
| 2,578,578 | Myers | Dec. 11, 1951 |
| 2,668,026 | Price | Feb. 2, 1954 |

FOREIGN PATENTS

| | | |
|---|---|---|
| 842,220 | France | Feb. 27, 1939 |
| 1,020,120 | France | Nov. 12, 1952 |